US011110763B2

(12) United States Patent
Pavlov et al.

(10) Patent No.: US 11,110,763 B2
(45) Date of Patent: Sep. 7, 2021

(54) TOW BAR QUICK-RELEASE MECHANISM

(71) Applicant: GOVERNMENT OF THE UNITED STATES, AS REPRESENTED BY THE SECRETARY OF THE ARMY, Washington, DC (US)

(72) Inventors: Kirill Pavlov, Southfield, MI (US); William E. Johnson, Davison, MI (US)

(73) Assignee: Government of the United States, as Represented by the Secretary of the Army, Washington, DC (US)

( * ) Notice: Subject to any disclaimer, the term of this patent is extended or adjusted under 35 U.S.C. 154(b) by 274 days.

(21) Appl. No.: 16/381,311

(22) Filed: Apr. 11, 2019

(65) Prior Publication Data

US 2020/0324595 A1 Oct. 15, 2020

(51) Int. Cl.
  *B60D 1/54* (2006.01)
  *B60D 1/155* (2006.01)
  *B60D 1/02* (2006.01)

(52) U.S. Cl.
  CPC ............... *B60D 1/54* (2013.01); *B60D 1/155* (2013.01); *B60D 1/02* (2013.01); *B60D 2001/544* (2013.01)

(58) Field of Classification Search
  None
  See application file for complete search history.

(56) References Cited

U.S. PATENT DOCUMENTS

| 2,136,440 | A | * | 11/1938 | Hufferd | B60D 1/50 280/485 |
| 3,385,611 | A | * | 5/1968 | Silver | B60D 1/06 280/511 |
| 3,963,266 | A | * | 6/1976 | Thelin | B60D 1/04 280/504 |
| 5,112,074 | A | * | 5/1992 | Smith | B60D 1/50 156/187 |
| 5,332,250 | A | * | 7/1994 | Thorwall | B60D 1/28 280/507 |
| 7,011,330 | B2 | * | 3/2006 | Blanton | B60D 1/02 280/510 |
| 7,055,845 | B1 | * | 6/2006 | Putnam | B60D 1/28 280/490.1 |
| 2018/0015797 | A1 | * | 1/2018 | Hancock | B60D 1/02 |

* cited by examiner

*Primary Examiner* — Kevin Hurley (57) ABSTRACT

One example embodiment is a tow bar retention mechanism for a vehicle tow bar of a combat vehicle. The tow bar retention mechanism includes a tow bar retention arm, an elongated locking beam, a quick-release locking mechanism, and a quick-release safety mechanism. The quick-release locking mechanism locks the tow bar retention arm in a locked position placing the vehicle tow bar in a stowed position. The quick-release locking mechanism also unlocks the tow bar retention arm allowing the tow bar retention arm to move to an unlocked position allowing the vehicle tow bar to move to a tow position. The quick-release safety mechanism may be placed in a first position preventing the quick-release locking mechanism from moving from the locked position. The quick-release safety mechanism may also be placed in a second position allowing the quick-release locking mechanism to move from the locked position.

18 Claims, 7 Drawing Sheets

TOW BAR QUICK-RELEASE MECHANISM

GOVERNMENT INTEREST

The inventions described herein may be made, used, or licensed by or for the U.S. Government for U.S. Government purposes. The U.S. Government has rights in the invention(s).

TECHNICAL FIELD

An apparatus provides for a tow bar quick-release. The quick-release may provide a rapid system for recovering military vehicles under fire in a hostile fire situation. In particular, the tow bar quick-release provides a way to release a tow bar on a vehicle without the slower process that requires moving the ratchet handle into a release position and then manually pulling on the strap to overcome the tension and to release the rolled up length of strap.

BACKGROUND

Ground combat vehicles (GCVs), trucks and other military vehicles are used in combat and may come under hostile fire. At times the hostile fire may disable the vehicle that may include disabling the power source (e.g., engine) of the vehicle. Often crew members prefer not to abandon a disabled vehicle receiving hostile fire, therefore, they will climb onto its front hood and begin the slow process that requires moving the ratchet handle into a release position and then manually pulling on the strap to overcome the tension and to release the rolled up length of strap. This allows for lowering a rather heavy tow bar that has earlier been ratcheted upward in front of the vehicle to a stored/stowed position. The tow bar is often very heavy and of a large size to allow the tow bar to be used when towing a combat vehicle. In order to secure this heavy tow bar, it is ratcheted upward toward the front of the vehicle to a stored/stowed position using canvas strapping and a mechanical ratchet. Unfortunately, in a hostile file fire situation a solder on the hood of a truck tugging on a ratchet strap to release tension from its ratchet and then to unwind the ratcheted strap to begin lowering down a tow bar attached to the strap is a clear target for enemy forces. What is need is a better way to release a tow bar so that it may be used to tow military vehicles without placing crew members in hostile file any longer than may be necessary.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One example embodiment is a tow bar quick-release assembly. The tow bar quick-release assembly includes an elongated locking beam, a tow bar retention arm, a quick-release locking pin, and a quick-release safety pin. The tow bar retention arm is adapted to move to a locked position. When in the locked position, a tow ring of a tow bar assembly of an armored vehicle is positioned around the elongated locking beam and the tow bar retention arm prevents removal of the tow ring from the elongated locking beam. The quick-release locking pin is adapted to be inserted into the elongated locking beam and inserted at least partially into the tow bar retention arm to prevent the tow bar retention arm from being moved from the locked position to an open position. When the tow bar retention arm is in the open position the tow ring may be removed from the elongated locking beam. The quick-release safety pin may be connected to the quick-release locking pin to prevent the quick-release locking pin from being removed from the tow bar retention arm without applying a threshold amount of force to the quick-release safety pin.

The tow bar quick-release assembly may have other useful features and components. For example, a main body portion of the quick-release locking pin may be cylindrical in shape. The quick-release safety pin may be a pull-pin adapted to be pulled from the quick-release locking pin and the pull-pin could be a cotter pin. Additionally, a lanyard or other string may be attached to the pull-pin and be pulled to pull the pull-pin from the quick-release locking pin. A compression spring may be mounted within the elongated locking beam and adapted to push the quick-release locking pin from tow bar retention arm. A coil spring may be positioned adjacent one end of the tow bar retention arm biasing the tow bar retention arm toward the open position.

The tow bar retention arm may be C-shaped and have a first end and a second end. The quick-release locking pin the may pass at least partially through the tow bar retention arm at the first end when the tow bar retention arm is in the locked position. The tow bar retention arm may rotate about the second end about a pivot point passing through the elongated locking beam. In some configurations, the tow bar quick-release assembly may further include a rectangularly box shaped strap housing assembly with an open end and tie-down strap with a first end attached to the strap housing and a second end attached to a hand winch. In other configurations, a force exerted by the tie-down strap is removed when the tow bar retention arm is moved to the unlocked position. In other configurations, the tow bar assembly of the armored vehicle is mounted on a front end of the armored vehicle in a substantially vertical position when the tow bar retention arm is in a locked position around the tow ring.

Another example embodiment is a tow bar retention mechanism for a vehicle tow bar of a combat vehicle. The tow bar retention mechanism includes a tow bar retention arm, an elongated locking beam, a quick-release locking mechanism, and a quick-release safety mechanism. The quick-release locking mechanism locks the tow bar retention arm in a locked position placing the vehicle tow bar in a stowed position. The quick-release locking mechanism also unlocks the tow bar retention arm allowing the tow bar retention arm to move to an unlocked position allowing the vehicle tow bar to move to a tow position. The quick-release safety mechanism may be placed in a first position preventing the quick-release locking mechanism from moving from the locked position. The quick-release safety mechanism may also be placed in a second position allowing the quick-release locking mechanism to be moved from the locked position.

In other configurations of this embodiment, the tow bar retention arm and the elongated locking beam wrap around a portion of the vehicle tow bar of the combat vehicle when in the locked position. The tow bar retention mechanism may further include a spring that is mounted to bias/move the tow bar retention arm from the locked position toward the unlocked position. A coil spring may additionally be mounted adjacent the second end to bias the tow bar retention arm toward the open position. The quick-release safety mechanism may include a safety pin to be pulled from the quick-release locking mechanism to unlock this locking mechanism.

Another example is a method of quickly lowering a vehicle tow bar on a ground military vehicle from a stowed position to a lowered position. The method includes pulling a quick-release safety pin from a quick-release locking pin. Upon the pulling of the quick-release safety pin from the quick-release locking pin, the quick-release locking pin is moved from a first position, which does not allow a tow bar retention arm to move, to a second position that allows the tow bar retention arm to move. The method moves the tow bar retention arm from a locked position, which prevents movement of the vehicle tow bar from the stowed position to the lower position, to an unlocked position. This retention arm movement may be caused by a bias spring. The method then allows for the vehicle tow bar to be pushed from the elongated locking beam, if necessary. The method allows for gravity to lower the vehicle tow bar to the ground and then for the vehicle tow bar to be moved into a towing position. The method of quickly lowering the vehicle tow bar optionally provides for towing the ground military vehicle to a different location than from where the quick-release safety pin was pulled and for automatically (for example, using a bias spring) moving the quick-release locking pin from the first position to the second position.

The following description and the annexed drawings set forth in detail certain illustrative aspects of the subject matter. However, these aspects are indicative of some of the numerous ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
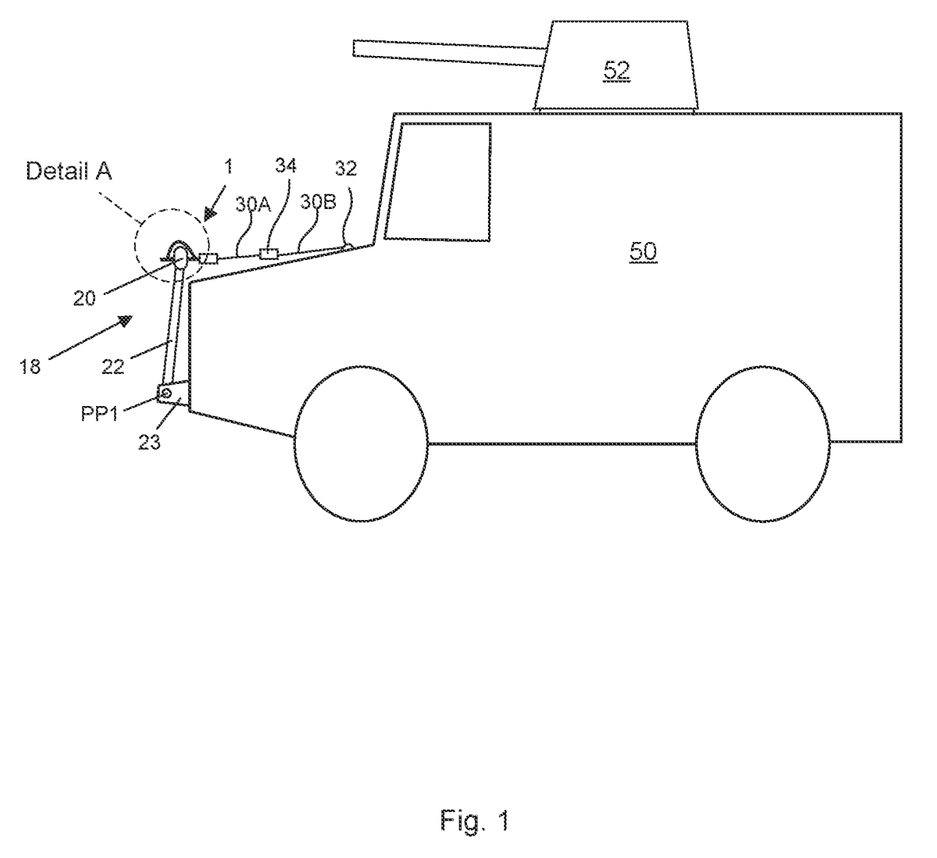
FIG. 1 illustrates one example embodiment of an apparatus of a tow bar quick-release assembly mounted on an armored vehicle for traveling over the ground.

FIG. 1 illustrates one example embodiment of an apparatus of a tow bar quick-release assembly 1 mounted on an armored vehicle 50 for traveling over the ground. The armored vehicle 50 may travel over a surface with tires and/or continuous tracks. This example armored vehicle 50 is illustrated with an example gun turret 52 that may support a cannon, a gun, or other weapons. Even though a military/armored vehicle 50 is illustrated, in other embodiments, the tow bar quick-release assembly 1 may be mounted with tow bars of tracked vehicles, military trucks, light armored vehicles, heavy armored vehicles, a Bradley fighting vehicle, a Stryker vehicle, an armored personnel carrier, a high mobility multipurpose wheeled vehicle (Hummvee), a light armored vehicle (LAV), an assault amphibious vehicle, a combat support vehicle, a mine-protected vehicle, a utility vehicle, commercial trucks and other vehicles as understood by those of ordinary skill in the art As will become apparent in the discussion of the embodiments below, the tow bar quick-release assembly 1 may release a tow bar assembly 18 in a fraction of the time it takes current and traditional ratchet systems. Additionally, this tow bar release method may be performed without a solder needing to climb up on the armored vehicle 50 and becoming an easy target for an enemy as the solder releases strapping form at latch to lower the tow bar. The combination of speed of tow bar release and eliminating a target of a solder on a truck hood will reduce solder injuries and deaths.

The armored vehicle 50 has a tow bar assembly 18, segments of tie-down straps 30A, 30B and a ratchet 34 for ratcheting one or more of the tie-down straps. The tie-down straps 30A, 30B may be straps suitable for towing, made with polyester webbing, or other materials, as understood by those of ordinary skill in the art, such as chains, rope, cables, or other suitable material for stowing the tow bar assembly 18 in a stowed position. One end of a strap may be connected to a connector 32, that may be a D-ring, eye bolt, or the like, attached to a front portion of the armored vehicle 50 as shown. Another end of one of the straps is connected to, or wound about, a portion of the tow bar quick-release assembly 1 as discussed below. The ratchet 34 may be any suitable ratchet for stowing the tow bar assembly 18 and tightening the tie-down straps 30A, 30B to a sufficient tension when the tow bar assembly 18 is not in use.

In general, with the exception of the tie-down straps 30A, 30B and quick-release pull string 15, many of the parts and components, discussed herein are formed with rigid materials. "Rigid material" is defined herein as any material that retains its shape when formed and that is not a liquid or a gas. Rigid material may be pre-formed into specific shapes such as C-channel, box-channel, as well as square and/or rectangular tubing. For example, rigid materials include metal steel, aluminum, plastics, wood, carbon fiber based material, etc. Many of these components may be rigidly connected (rigidly mounted) with each other unless they clearly move with respect to each other or their movements are discussed herein. "Rigidly connected" or "rigidly mounted" is defined herein to mean that two or more materials are connected together by welding, fusion, bolts, glue, clamps and/or connected together in another way as understood by a person with ordinary skill in the art so that the connected components essentially do not move relative to each other.

The tow bar assembly 18 includes a tow rod 22 with a tow ring 20 mounted at one end of the tow rod 22. A second end of the tow rod 22 is pivotally connected at a pivot point PP1 formed by a pair of front flanges 23 projecting form a lower front portion of the armored vehicle 50. The tow bar assembly 18 may be pivoted about the pivot point PP1 to place it in a towing position or a stow position as explained further below. Of course, any suitable type of tow bar assembly may be used as understood by those of ordinary skill in the art.

Unlike prior art tow bar assemblies that were lowered by placing a ratchet handle in a release position and then tugging on the strap to release pressure and releasing strapping from a coiled strap attached the tow bar assembly, the tow bar assembly 18 of FIGS. 1-5 is quickly and completely released from its tie-down straps 30A, 30B by using the tow bar quick-release assembly 1. As illustrated in example FIGS. 2-5, one embodiment of this assembly includes a tow bar retention arm 3, a locking beam 14, and a strap housing assembly 12. In a locked position, the tow ring 20 is placed around the locking beam 14. The tow bar retention arm 3 is pivoted at pivot point PP2 to be moved in a direction opposite arrow B so that the tow bar retention arm 3 wraps around the tow ring 20 as illustrated best in FIG. 2 to lock the tow bar assembly 18 into a stowed position. A quick-release locking mechanism 40 locks the tow bar retention arm 3 to the locking beam 14 preventing the tow ring 20 and, thus, the tow bar assembly 18 from moving from the stowed position.

In one embodiment, the quick-release locking mechanism 40 includes a quick-release locking pin 42, a quick-release safety pin 32, and pull string 15. When locked in the stowed position, the quick-release locking pin 42 extends from an interior chamber in the locking beam 14 through an opening 44 in a distal end 46 of the tow bar retention arm 3. The quick-release safety pin 32 is passed through a complementary opening in the quick-release locking pin 42 to prevent the quick-release locking mechanism 40 moving from the locked/stowed position to an open position. The quick-release safety pin 32 may be a cotter pin or another pin as desired by one of ordinary skill in the art. In some embodiments the quick-release safety pin 32 is easily removed with a pull on a string 15 attached to it to move the tow bar quick-release assembly 1 from the locked/stowed position to an unlocked position to all the tow bar assembly 18 to be rapidly placed in a position for towing the armored vehicle 50.

Figures 3A, 3B, 3D:
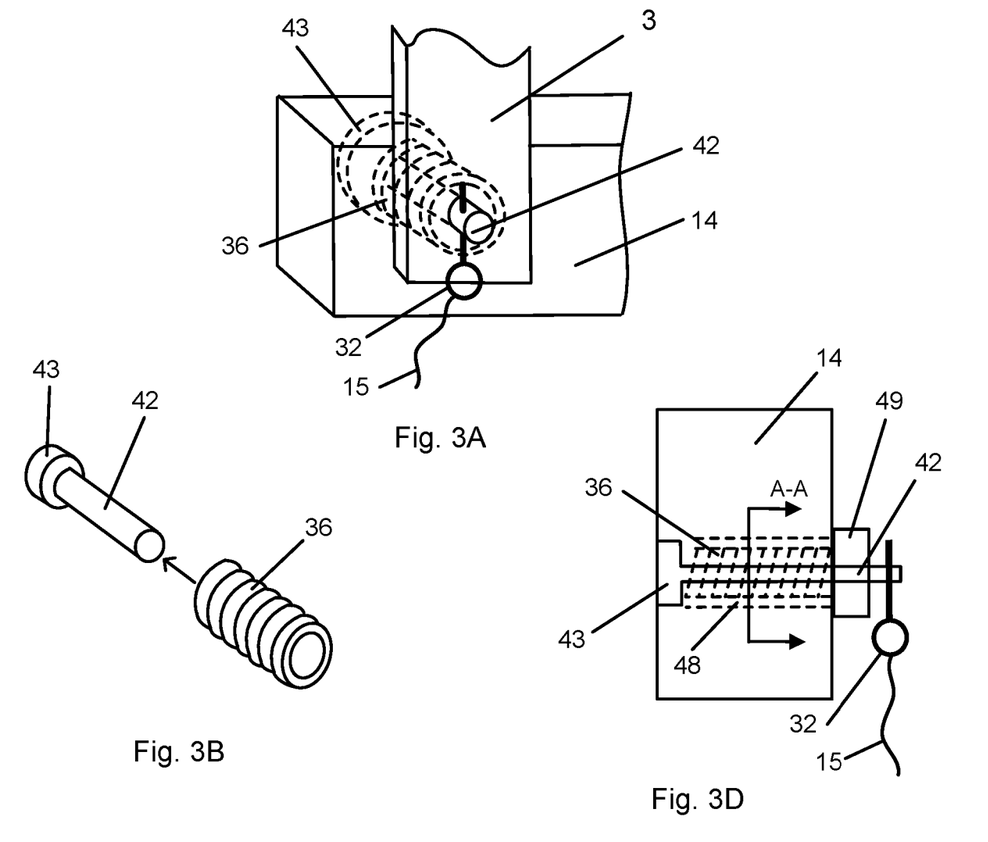
FIGS. 3A-E illustrate other example detailed views of the tow bar quick-release assembly of FIG. 1.
Figure 3C:
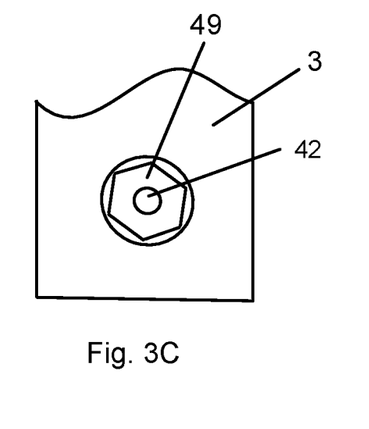
Figure 3E:
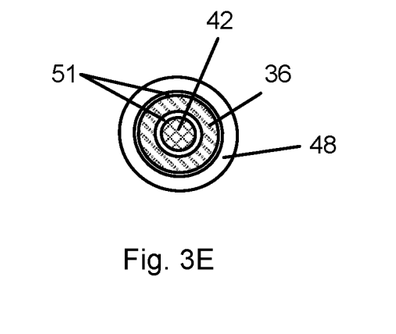

In additional embodiments, the quick-release locking mechanism 40 may include a pin bias spring 36 (best seen in Figure s 3A, 3B, 3D and 3F) to apply bias pressure to the quick-release locking pin 42 to tend to move the quick-release locking pin 42 in the direction of arrow D to the unlocked position. The pin bias spring 36 may be any desirable compression spring or similar device. The quick-release locking pin 42 may have an outward projecting flanged area 43 at one of its ends. In the locked position, the pin bias spring 36 may become partially compressed and pressed on the flanged area 43. When the quick-release safety pin 32 is removed, the spring may eject the quick-release locking pin 42 out of the locking beam 14 allowing the tow bar retention arm 3 to rotate upward and release the tow ring 20 from the tow bar retention arm 3.

In some embodiments a threaded cylinder 48 (FIG. 3D) may be inserted into the locking beam 14 so that the pin bias spring 36 and the quick-release locking pin 42 can be inserted inside the threaded cylinder 48. A nut 49 may be attached to an end of the threaded cylinder 48 to hold the pin bias spring 36 and the quick-release locking pin 42 in place. An opening in the center of the nut 49 allows an end of the quick-release locking pin 42 to pass through the nut 49 when the quick-release locking pin 42 is in the locked position. In some configurations, there may be air gaps 51 (FIG. 3E) between one or more of the threaded cylinder 48 and the bias spring 36 and/or the quick-release locking pin 42 and the bias spring 36.

Figure 4:
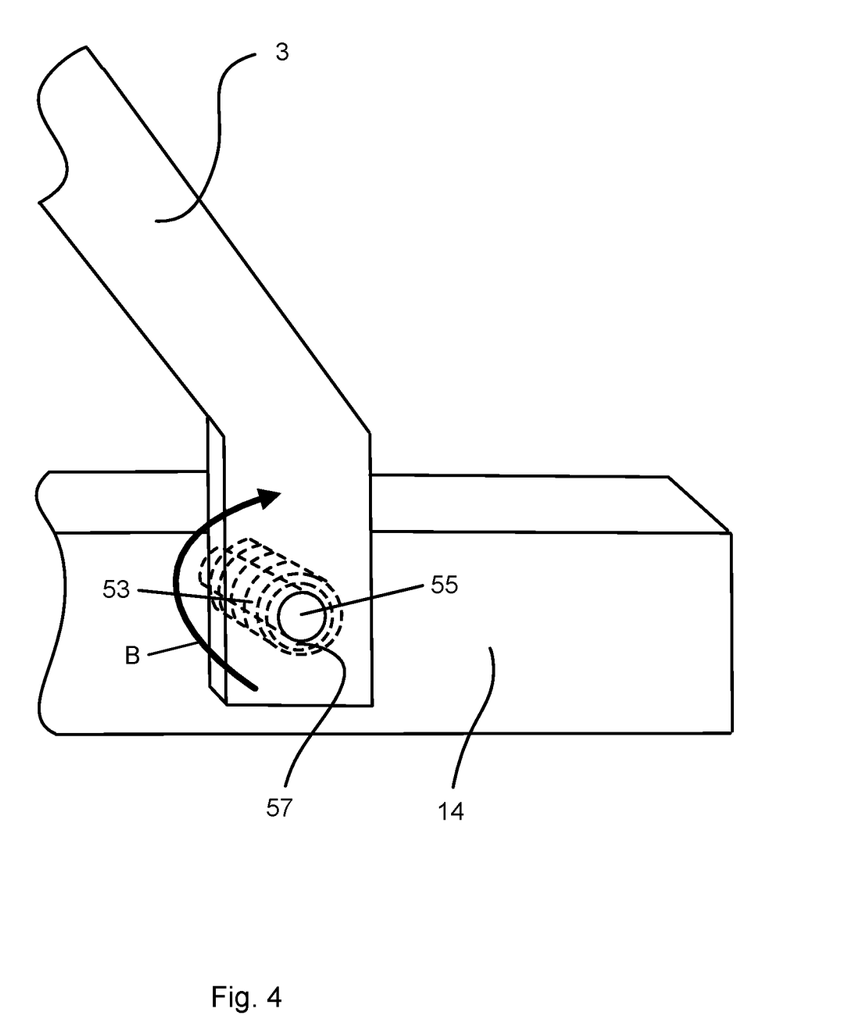
FIG. 4 illustrates an example configuration of a detailed view of the tow bar quick-release assembly of FIG. 1 with a cylindrical pivot arm and a rotational biased spring.

As best seen in FIG. 4, the tow bar retention arm 3 may be installed to pivot around a cylindrical pivot arm 55 extending from a chamber 57 in the locking beam 14. A rotationally biased spring 53 may also at least partially be installed around the cylindrical pivot arm 55 within the chamber 57 within the locking beam 14. This spring 53 may rotationally bias the tow bar retention arm 3 in the direction of arrow F so that when the quick-release locking pin 42 releases the locking beam 14 the tow bar retention arm 3 is biased in the direction of arrow B to release the 20 tow ring.

Figure 2:
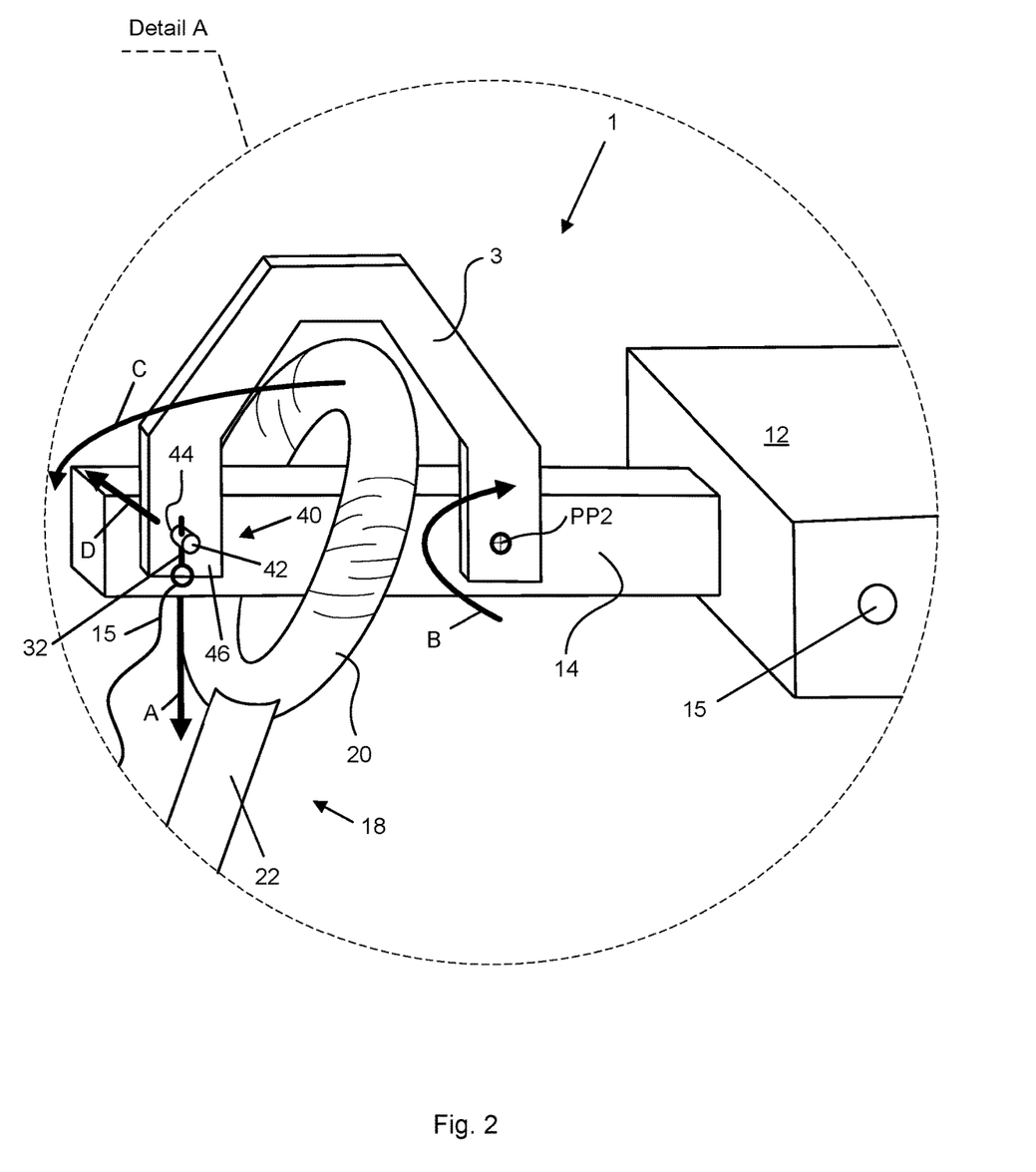
FIG. 2 illustrates one example configuration of a detailed view of the tow bar quick-release assembly of FIG. 1 in a closed/locked position.

As best seen in FIG. 2, the strap housing assembly 12 is a hollow rectangular box-like shape with an open end where tie-down strap 30A may enter. Preferably, the strap housing assembly 12 is made of metal but it may be made with any strong enough desirable material. The strap housing assembly 12 includes a cylindrical component 15 that the tie-down strap 30A is attached to. Of course, in other configurations, the tie-down strap 30A may be attached to the strap housing assembly 12 in any other suitable way as desired by those of ordinary skill in the art.

Figure 5:
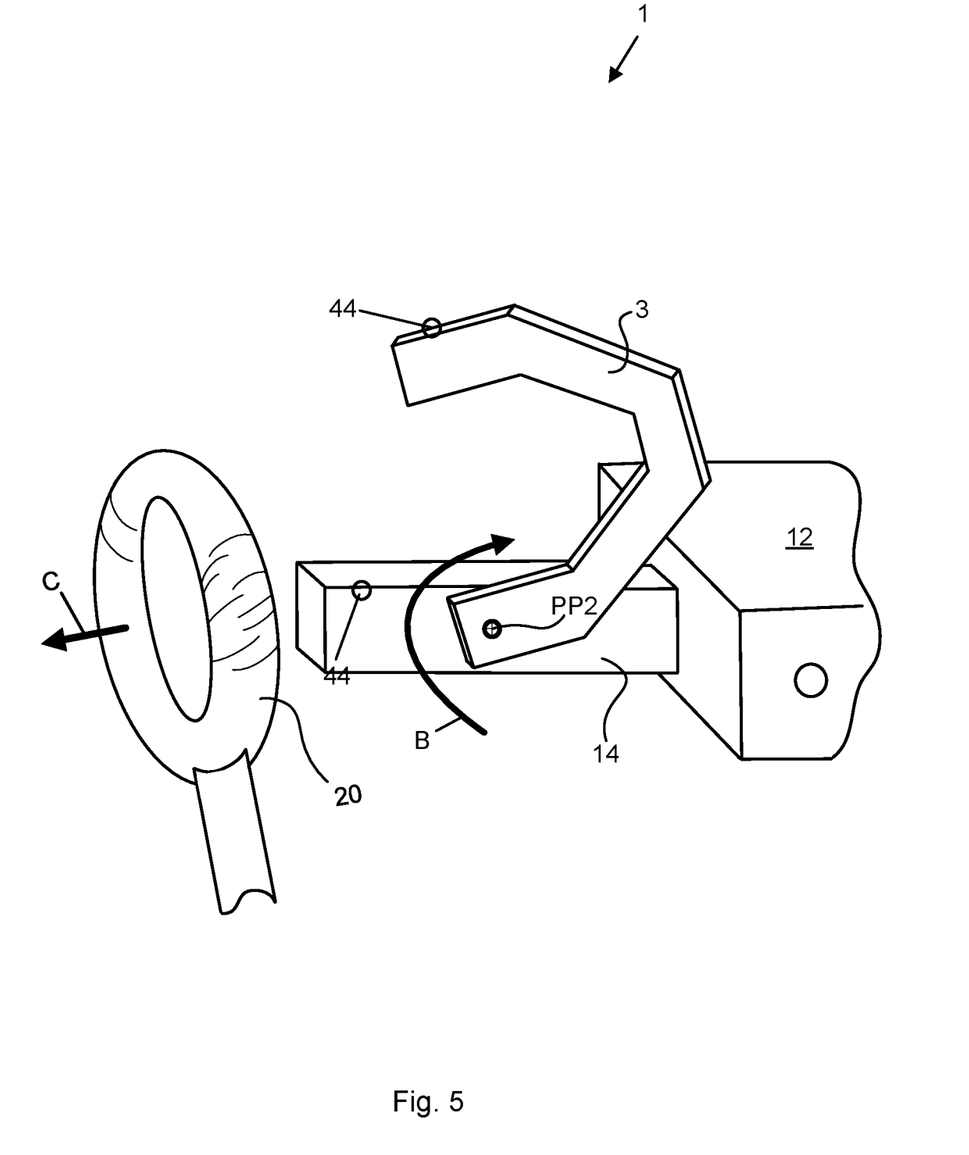
FIG. 5 illustrates one example configuration of a detailed view of the tow bar quick-release assembly of FIG. 1 in an open/unlocked position.

FIG. 5 illustrates the tow bar quick-release assembly 1 in an open position with the quick-release locking pin 42 removed from the opening 44 in the tow bar retention arm 3. In this position, the quick-release locking pin 42 has been retracted into the locking beam 14 to release the tow bar retention arm 3 in the direction of arrow B toward an unlocked position. As previously mentioned, upon the quick-release safety pin 32 being removed, the bias spring 36 may assist in forcing the quick-release locking pin 42 away from the tow bar retention arm 3 which allows the spring 53 to rotationally bias the tow bar retention arm 3 in the direction of arrow B away from the tow ring 20. Now, the tow bar assembly 18, which includes the tow rod 22 and the tow ring 20, can be quickly lowered/dropped for use in a towing operation.

Figure 6A:
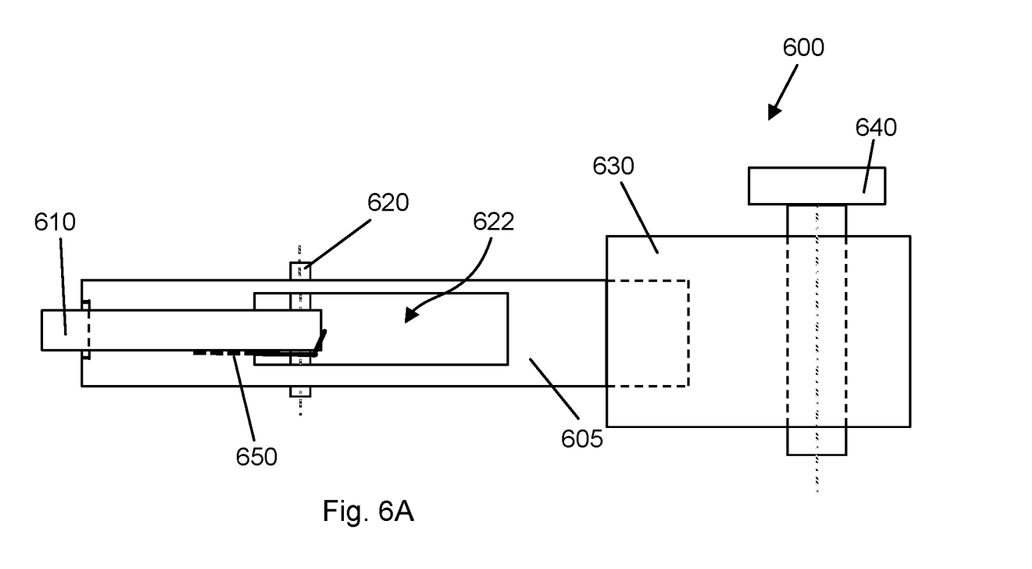
FIG. 6A illustrates a top view of another example of a second embodiment of an apparatus of a tow bar quick-release assembly mounted on an armored vehicle for traveling over the ground.
Figure 6B:
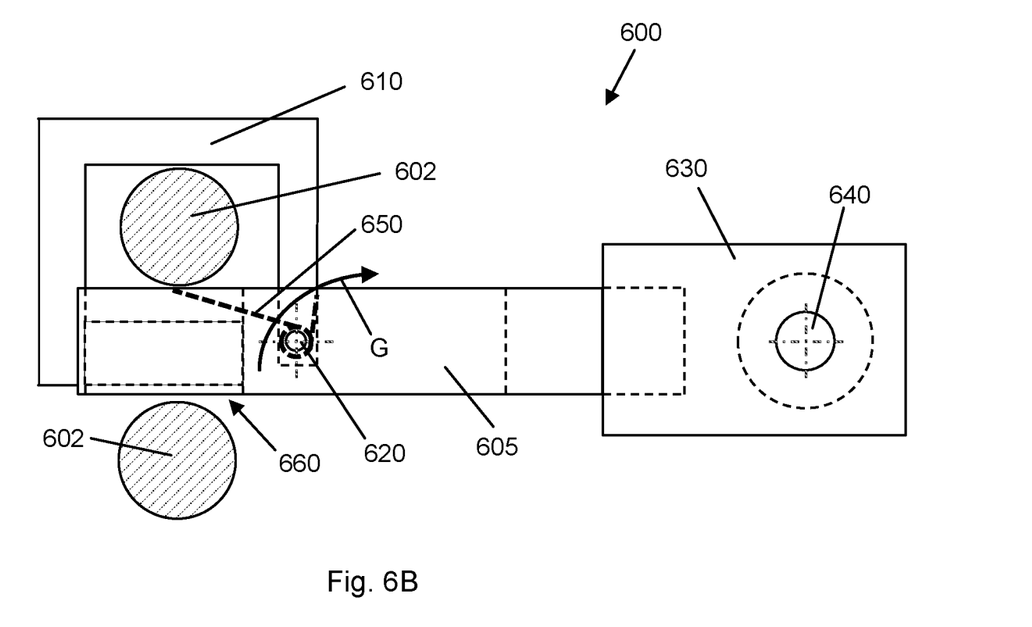
FIG. 6B illustrates a side cross-sectional view of the second embodiment of an apparatus of a tow bar quick-release assembly mounted on an armored vehicle for traveling over the ground.

FIGS. 6A and 6B illustrate a top view and a side view, respectively, of another tow bar quick-release assembly 600 for locking a tow bar 602 into a stowed position and for allowing a quick-release of the tow bar 602. The tow bar 602 is show in FIG. 6A but not in FIG. 6B for purposes of simplicity and clarity. The illustrated tow bar 602 is a cross-section side view of the tow ring 20 of the previous embodiment and may be the tow ring of a similar tow bar assembly 18. The tow bar quick-release assembly 600 includes a tow bar beam 605, tow bar retention hook 610, a tow bar retention hook pin 620, a strap frame 630, a ratchet strap retention pin 640, a tow bar retention spring 650, and a tow bar locking device 660. The illustrated tow bar 602 is a cross-section side view of the tow ring 20 of the previous embodiment and may be the tow ring of a similar tow bar assembly 18.

An opening 622 is formed in the tow bar beam 605 to allow the tow bar retention hook 610 to rotate in the direction of arrow G at least partially into the opening 622 when the tow bar retention hook 610 is released by the tow bar locking device 660. The tow bar retention spring 650 may be a coiled spring to bias the tow bar retention hook 610 to rotate about the tow bar retention hook pin 620 in the direction of arrow G when the tow bar retention hook 610 is released by the tow bar locking device 660. The tow bar locking device 660 may be any suitable locking device and may be different than what is illustrated here. For example, the tow bar locking device 660 may be a pin or a spring biased bin (as discussed above), a latch type of locking device, or another type of locking device as understood by those of ordinary skill in the art. The tow bar locking device 660 may have a quick-release portion such as the quick-release safety pin 32 discussed above or another-quick release portion as understood by those of ordinary skill in the art.

Some embodiments may be implemented with commercial of the shelf (COTS) parts allowing for rapid production of the tow bar quick-release assembly 1 and rapidly attached to current vehicles of the United States Army to quickly save solder and crew-member lives.

Methods that can be implemented in accordance with the disclosed subject matter, may be at least partially implemented with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that in some embodiments the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 7:
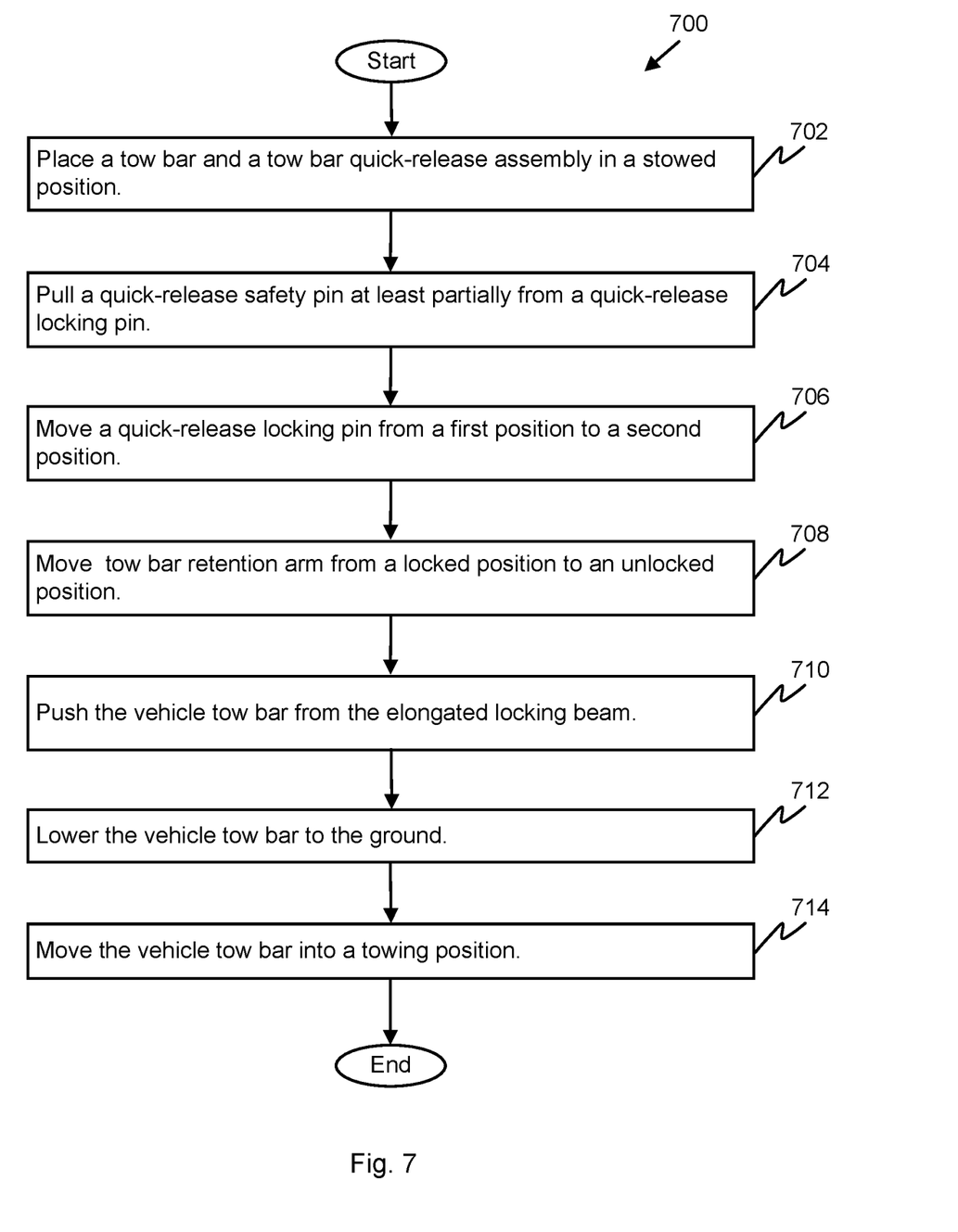
FIG. 7 illustrates an example view of a method of operating a vehicle tow bar quick-release assembly mounted on an armored vehicle.

FIG. 7 illustrates a method 700 of operating a vehicle tow bar quick-release assembly mounted on an armored vehicle that may be similar to the tow bar quick-release assembly 1 discussed above. Initially, the a tow bar quick-release assembly is placed in a stowed position, at 702, generally by ratcheting tie-down straps to place a heavy to bar on the armored vehicle in this position. In this position, the tow bar quick-release assembly in combination with the tie-down straps (as illustrated in FIG. 1 and discussed above) locks the vehicle tow bar into a stowed position Later, when the vehicle tow bar needs to be used and placed in a towing position, for example when the vehicle becomes disable in a hostile fire situation, the tow bar quick-release assembly may be operated to rapidly disconnect the vehicle tow bar from the tow bar quick-release assembly. First, the method 700 pulls a quick-release safety pin at least partially from a quick-release locking pin, at 704. Upon the pulling of the quick-release safety pin at least partially from a quick-release locking pin, a quick-release locking pin is moved, at 706, from a first position, which does not allow a tow bar retention arm to move, to a second position which allows the tow bar retention arm to move. The method 700 moves tow bar retention arm, at 708, from a locked position, which prevents movement of the vehicle tow bar from the stowed position to the lower/towing position, to an unlocked position. This retention arm movement may be caused by a bias spring. The method 700 then allows for the vehicle tow bar to be pushed, at 710, from the elongated locking beam, if necessary. The method 700 allows for gravity to lower the vehicle tow bar, at 712, to the ground and then for the vehicle tow bar to be moved into a towing position, at 714. The method 700 of quickly lowering a vehicle tow bar optionally provides for towing the ground military vehicle to a different location than from where the quick-release safety pin was pulled and for automatically (for example, using a bias spring) moving the quick-release locking pin from the first position to the second position.

In the foregoing description, certain terms have been used for brevity, cleanness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims. Accordingly, the disclosure is intended to embrace all such alterations, modifications, and variations that fall within the scope of this application, including the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Additionally, references to "the preferred embodiment", "an embodiment", "one example", "an example" and the like, are not to be construed as preferred or advantageous over other embodiments or designs. Rather, use of the words "the preferred embodiment", "an embodiment", "one example", "an example" and the like are intended to present concepts in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A tow bar quick-release assembly comprising:
   an elongated locking beam;

a tow bar retention arm adapted to be moved to a locked position, wherein when in the locked position a tow ring of a tow bar assembly of an armored vehicle is positioned around the elongated locking beam and the tow bar retention arm prevents removal of the tow ring from the elongated locking beam;

a quick-release locking pin adapted to be inserted into the elongated locking beam and inserted at least partially into the tow bar retention arm to prevent the tow bar retention arm moving from the locked position to an open position, and wherein when the tow bar retention arm is in the open position the tow ring may be removed from the elongated locking beam;

a quick-release safety pin adapted to be connected to the quick-release locking pin to prevent the quick-release locking pin from being removed from the tow bar retention arm without applying a threshold amount of force to the quick-release safety pin; and a compression spring mounted within the elongated locking beam adapted to push the quick-release locking pin away from the tow bar retention arm.

2. The tow bar quick-release assembly of claim 1 wherein a main body portion of the quick-release locking pin is cylindrical in shape.

3. The tow bar quick-release assembly of claim 1 wherein the quick-release safety pin further comprises:
a pull-pin adapted to be pulled from the quick-release locking pin.

4. The tow bar quick-release assembly of claim 3 wherein the pull-pin is a cotter pin.

5. The tow bar quick-release assembly of claim 4 further comprising:
a lanyard attached to the pull-pin adapted to pull the pull-pin from the quick-release locking pin.

6. The tow bar quick-release assembly of claim 1 wherein the tow bar retention arm is C-shaped.

7. The tow bar quick-release assembly of claim 6 wherein the tow bar retention arm has a first end and a second end, wherein the quick-release locking pin passes at least partially through the tow bar retention arm at the first end when the tow bar retention arm is in the locked position, and wherein the tow bar retention arm rotates about the second end about a pivot point passing through the elongated locking beam.

8. The tow bar quick-release assembly of claim 7 further comprising:
a coil spring adjacent the second end biasing the tow bar retention arm toward the open position.

9. The tow bar quick-release assembly of claim 1 further comprising:
a rectangularly box shaped strap housing assembly with an open end; and
a tie-down strap with a first end attached to the strap housing.

10. The tow bar quick-release assembly of claim 9 wherein a force exerted by the tie-down strap is removed when the tow bar retention arm is moved to the unlocked position.

11. The tow bar quick-release assembly of claim 9 wherein the tow bar assembly of the armored vehicle is mounted on a front end of the armored vehicle in a substantially vertical position when the tow bar retention arm is in a locked position around the tow ring.

12. A tow bar retention mechanism for a vehicle tow bar of a combat vehicle comprising:
a tow bar retention arm;
an elongated locking beam;
a quick-release locking mechanism adapted to lock the tow bar retention arm in a locked position to place the vehicle tow bar of the combat vehicle in a stowed position, wherein the quick-release locking mechanism is adapted to unlock the tow bar retention arm to allow the tow bar retention arm to be moved to an unlocked position to allow the vehicle tow bar to be moved to a tow position;
a quick-release safety mechanism adapted to be placed in a first position to prevent the quick-release locking mechanism to be moved from the locked position, and wherein the quick-release safety mechanism is adapted to be placed in a second position to allow the quick-release locking mechanism to be moved from the locked position to the unlocked position; and
a spring mounted to move the tow bar retention arm from the locked position toward the unlocked position.

13. The tow bar retention mechanism of claim 12 wherein the tow bar retention arm and the elongated locking beam wrap around a portion of the vehicle tow bar of the combat vehicle when in the locked position.

14. The tow bar retention mechanism of claim 12 further comprising:
a coil spring adjacent the second end biasing the tow bar retention arm toward the open position.

15. The tow bar retention mechanism of claim 12 wherein the quick-release safety mechanism further comprises:
a safety pin adapted to be pulled from the quick-release locking mechanism.

16. A method of quickly lowering a vehicle tow bar on a ground military vehicle from a stowed position to a lower position comprising:
pulling a quick-release safety pin at least partially from a quick-release locking pin;
upon the pulling of the quick-release safety pin at least partially from a quick-release locking pin, moving a quick-release locking pin from a first position, that does not allow a tow bar retention arm to move, to a second position that allows the tow bar retention arm to move;
moving a tow bar retention arm from a locked position, that prevents movement of the vehicle tow bar from the stowed position to the lower position, to an unlocked position;
pushing the vehicle tow bar from the elongated locking beam;
allowing gravity to lower the vehicle tow bar to the ground; and
moving the vehicle tow bar to a towing position.

17. The method of quickly lowering a vehicle tow bar of claim 16 further comprising:
towing the ground military vehicle to a different location than from where the quick-release safety pin was pulled.

18. The method of quickly lowering a vehicle tow bar of claim 16 further comprising:
automatically moving the quick-release locking pin from the first position to the second position.

* * * * *